(12) United States Patent
Khan et al.

(10) Patent No.: US 12,234,156 B1
(45) Date of Patent: Feb. 25, 2025

(54) METHOD FOR MAKING NANOSILICA FROM GLASS WASTE

(71) Applicant: KING SAUD UNIVERSITY, Riyadh (SA)

(72) Inventors: Mohammad Iqbal Khan, Riyadh (SA); Galal Mohamed Fares, Riyadh (SA); Yassir Mohammed Abbas, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/777,964

(22) Filed: Jul. 19, 2024

(51) Int. Cl.
*C01B 33/18* (2006.01)

(52) U.S. Cl.
CPC .......... *C01B 33/18* (2013.01); *C01P 2004/03* (2013.01); *C01P 2006/11* (2013.01)

(58) Field of Classification Search
CPC ... C01B 33/18; C01P 2004/03; C01P 2004/11
See application file for complete search history.

(56) References Cited

FOREIGN PATENT DOCUMENTS

| CN | 108010602 B | 1/2020 |
| CN | 111170645 A | 5/2020 |
| CN | 113617496 B | 1/2023 |

OTHER PUBLICATIONS

Owoeye, Seun Samuel, Segun Michael Abegunde, and Babatunde Oji. "Effects of process variable on synthesis and characterization of amorphous silica nanoparticles using sodium silicate solutions as precursor by sol-gel method." Nano-Structures & Nano-Objects 25 (2021): 100625.*
Samadi, Mostafa, et al. "Influence of glass silica waste nano powder on the mechanical and microstructure properties of alkali-activated mortars." Nanomaterials 10.2 (2020): 324.*
Odaa, Sief Aldeen, Abdulkader Ismail Al-Hadithi, and Yousif A. Mansoor. "Preparation and Characterization of Nano-waste glass powder." Results in Materials 20 (2023): 100470.*
Chen, Qing, et al. "Effect of dispersants on dispersion of glassfiber suspensions." Asian Journal of Chemistry 26.16 (2014): 5100.*
Jiang, Qi, et al. "Superhydrophobic surface of glass powder derived from wet milling with aliphatic chemicals modification." Ceramics International 47.20 (2021): 29091-29098.*
Asadi, et al.; "Synthesis of colloidal nanosilica from waste glass powder as a low cost precursor," DOI: https://doi.org/10.1016/j.ceramint.2018.09.050, Ceramics International vol. 44, Issue 18, Dec. 15, 2018, pp. 22692-22697.

* cited by examiner

*Primary Examiner* — Richard M Rump
(74) *Attorney, Agent, or Firm* — Nath, Goldberg & Meyer; Joshua B. Goldberg

(57) ABSTRACT

A method of making nanosilica from glass, the method comprising: gathering glass waste; grinding the glass waste to obtain a glass powder containing nanoparticles; adding the glass powder containing the nanoparticles to a water solution comprising a dispersing agent to obtain a colloidal system containing nanoparticles; separating the nanoparticles from the colloidal system to obtain separated nanoparticles; and drying the separated nanoparticles to obtain nanosilica.

19 Claims, 2 Drawing Sheets

METHOD FOR MAKING NANOSILICA FROM GLASS WASTE

BACKGROUND

1. Field

The disclosure of the present patent application relates to a method for producing nanoparticles from glass waste and, particularly, to an effective method of making nanosilica from glass waste.

2. Description of the Related Art

Glass can be infinitely recyclable without a loss in quality. Recycling glass has many proven environmental benefits—it reduces emissions, saves energy, and reduces consumption of raw materials. As a common household item, recycling the material maintains much public support. However, many recycling facilities are no longer accepting glass for a variety of reasons including contamination, the hazard of broken glass, the weight of glass, and an ever-changing market.

Many recycling facilities are not accepting glass because glass has become a contaminant. That is, in a single stream recycling system, glass is increasingly becoming the contaminant. Broken glass can contaminate other recyclables like paper and cardboard, lowering their value. Recyclers are increasingly focused on quality and reducing contamination to maintain the value of their recyclable materials.

Another reason recycling facilities are no longer accepting glass is because broken glass can pose a safety issue. Broken glass is not only a safety hazard to workers, but it can also damage machines at recycling facilities. As a result, the inclusion of glass among recycling materials is increasing processing costs.

A further reason many recycling facilities are no longer accepting glass is because broken glass can be difficult to sort. Most manufacturers require recyclable glass to be sorted by color in order to produce high quality glass bottles and jars. Glass is difficult to sort when broken, and if broken down too finely, glass may become too difficult to reprocess. When recyclers find it too difficult or expensive to separate out glass, they send the entire stream to the landfill. According to Recycle Across America, "More than 28 billion glass bottles and jars end up in landfills every year—that is the equivalent of filling up two Empire State Buildings every three weeks."

Another reason recycling facilities are no longer accepting glass is because glass is heavy in bulk. Glass is heavy and expensive to transport. Faced with high costs, some communities are paying to have the glass specially crushed for use in construction. And while this is certainly a use for glass, it is not necessarily the best use.

Yet another reason recycling facilities are no longer accepting glass is because the demand for glass in recycling programs has decreased. Mandatory glass recycling programs in the 1980s flooded the market with recyclable glass, causing prices to drop. Over the past two decades, glass has also been replaced by aluminum and plastic for some products, leading to less demand.

However, glass is still an abundant product and can be useful when repurposed. The recycling of waste glass into valuable products becomes economically effective through the transformation of the waste glass into a worthwhile product.

Thus, a method for repurposing glass waste into a more renewable product is desired.

SUMMARY

The recycling of waste glass into valuable products can become economically effective through the transformation of the waste glass into a worthwhile product. The present subject matter relates to a method of converting glass waste into nanoparticles using a high-energy ball milling process that utilizes a phase separation process to convert the glass waste into nanoparticles. A series of optimized grindings on glass waste can be performed to obtain nanoparticles as a resultant glass powder (GP), which glass powder can then be added to a water solution containing an appropriate dispersing agent, thereby forming a colloidal system. A separation funnel can then be used to easily separate the nanoparticles via a separation process. Nanoparticles can be made dry by using various destabilizing techniques, such as sonication or drying by way of non-limiting example, in order to obtain a dry product. This nanoparticle dry product can be nanosilica particles.

The present disclosure also relates to a method of making nanoparticles from glass, the method comprising: gathering glass waste; grinding the glass waste to obtain a glass powder containing nanoparticles; adding the glass powder containing the nanoparticles to a water solution comprising a dispersing agent to obtain a colloidal system containing the nanoparticles; separating the nanoparticles from the colloidal system to obtain separated nanoparticles; and drying the separated nanoparticles to obtain nanosilica.

These and other features of the present subject matter will become readily apparent upon further review of the following specification.

DETAILED DESCRIPTION OF THE PREFERRED EMBODIMENTS

Figure 1:
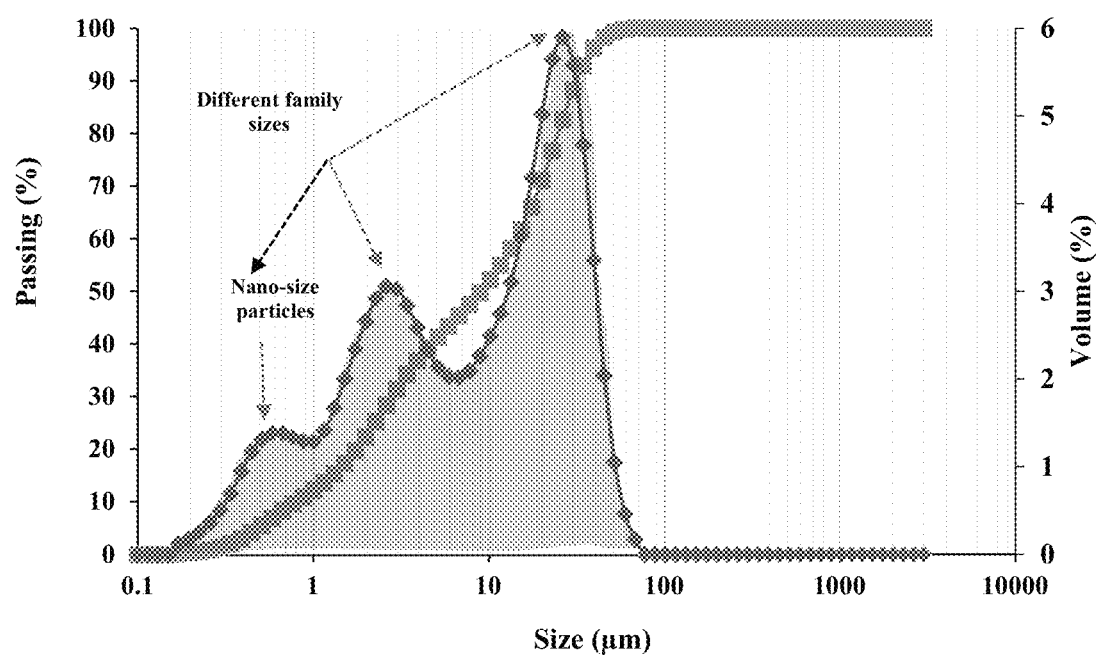
FIG. 1 is a graph showing particle size distribution of glass powder made according to the present methods.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

It will be understood by those skilled in the art with respect to any chemical group containing one or more substituents that such groups are not intended to introduce any substitution or substitution patterns that are sterically impractical and/or physically non-feasible.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The recycling of waste glass into valuable products can become economically effective through the transformation of the waste glass into a worthwhile product. Accordingly, the present subject matter relates to a method of converting glass waste into nanoparticles using a high-energy ball milling process that utilizes a phase separation process to convert the glass waste into nanoparticles. A series of optimized grindings on glass waste can be performed to obtain nanoparticles as a resultant glass powder (GP), which glass powder can then be added to a water solution containing an appropriate dispersing agent, thereby forming a colloidal system. A separation funnel can then be used to easily separate the nanoparticles via a separation process. Nanoparticles can be made dry by using destabilizing techniques, such as sonication or drying as non-limiting examples, in order to obtain a dry product. This nanoparticle dry product can be nanosilica particles.

The final results of this process are shown in FIG. 1. Based on laser particle-size distribution analysis, the presence of nano-sized glass particles is confirmed using laser particle-size distribution analysis as shown in FIG. 1. The calculated density of nano-GP particles as shown in FIG. 1 is about 2.48 g/cm$^3$.

According to the methods as described herein, high-energy ball milling can be used to grind the materials, e.g., the glass material. In one embodiment, two types of consecutive grinding using different grinders can be followed. In particular embodiments, a Pulversette 6 (Pulversette is a registered trademark of Frisch GmbH of Germany) grinder may be used. The Pulversette series of grinders typically has grinding bowl sizes of about 40 mL to about 900 mL. The rotation speed on the available series of Pulversette 5, Pulversette 6, and Pulversette 7 grinders may typically range from about 50 RPM to about 1100 RPM.

In other embodiments, other grinders of similar strength and size may be used. For example, a Retsch grinder may be used in an alternative implementation of the methods as described herein (Retsch is a registered trademark of Retsch GmbH of Germany). Retsch grinders may include two grinding bowls per machine, ranging in volume from about 12 mL to about 500 mL. The Retsch grinders may also have motors that can reach a speed up to about 800 RPM.

In other embodiments, other grinders of similar strength and size may be used according to the instant methods and to obtain the instant product.

The elevated grindability of glass powder can make rendering nano-sized powder achievable. The end product of this process may be a nanoscale glass powder. As a comparison, the volume of the balls can be approximately 4.5 times greater than the volume of solid matter. With regards to the number of balls in the Pulversette 6 grinder, for example, there can be up to 20 balls, or 20 balls, whereas there can be up to 26 balls, or 26 balls in the Retsch grinder, for example. In one embodiment, the Pulversette 6 grinder can be set at about 300 rpm, under which conditions the device can be run for about 300 minutes continuously with about 10-minute intervals between rotations. On the other hand, the Retsch grinder can be adjusted ten times at a maximum setting of about 600 rpm for a total of about 15 minutes.

In an embodiment, the present disclosure also relates to a method of making nanosilica from glass, the method comprising: gathering glass waste; grinding the glass waste to obtain a glass powder containing nanoparticles; adding the glass powder containing the nanoparticles to a water solution comprising a dispersing agent to obtain a colloidal system containing nanoparticles; separating the nanoparticles from the colloidal system to obtain separated nanoparticles; and drying the separated nanoparticles to obtain nanosilica.

In other embodiments, grinding the glass waste into glass powder may include hammering the glass waste into ready to grind pieces, which may comprise manually crushing glass with one of, e.g., a hammer and a mallet. In other embodiments, grinding the glass waste into glass powder can comprise grinding the glass waste in an automatic glass crusher, or a balling crusher machine. A balling crusher machine may include the Pulversette 6 or Retsch Grinder as described above, or other industrial grinders.

In various embodiments, an amount of glass waste to be converted into nanosilica at any one time may comprise about 200 g. In other embodiments, the amount of glass waste may be more than 200 g. In still other embodiments, the amount of glass may be less than 200 g.

In a further embodiment, the dispersing agent may be prepared using sodium hexa-meta-phosphate (SHMP). In some embodiments, the SHMP may comprise a concentration of about 0.01-0.1% by volume of the SMHP.

In another embodiment, a method of separating the nanoparticles may be selected from a group comprising using a separation funnel and centrifuging or heating.

In other embodiments, drying the nanoparticles may comprise sonicating the nanoparticles.

In another embodiment, the present disclosure also relates to a method of making nanosilica from glass waste, the method comprising: gathering glass waste; adding an amount of the glass waste into a grinding bowl of a grinding machine; adding steel balls to the grinding bowl; grinding the glass waste in the grinding machine for about 300 minutes at about 300 RPM to obtain a glass powder containing nanoparticles; adding the glass powder containing the nanoparticles to a water solution comprising a dispersing agent to obtain a colloidal system containing the nanoparticles; separating the nanoparticles from the colloidal system to obtain separated nanoparticles; and drying the separated nanoparticles to obtain nanosilica.

In a further embodiment, a grinding bowl of a grinding machine may have a capacity of about 40 mL to about 900 mL.

In other embodiments, 20 steel balls may be added to the grinding bowl.

In another embodiment, the grinding bowl may be in a grinder machine and the grinder machine can have a motor with a speed of about 50 RPM to about 1100 RPM. The motor may be run continuously for about 300 minutes in about 10-minute intervals.

In a further embodiment, the grinding bowl may have a capacity of about 12 mL to about 500 mL.

In other embodiments, 26 steel balls may be added to the grinding bowl.

In another embodiment, grinding the ready to grind pieces may comprise running a grinding machine at about 600 RPM for at least about 15 minutes.

In some embodiments, the dispersing agent may be prepared using sodium hexa-meta-phosphate (SHMP). The SHMP may have a concentration of about 0.01-0.1% by volume. In other embodiments, any other appropriate dispersing agent may be used, such as but not limited to surfactants, ionic solutions, polyethelene glycol, and any combination thereof.

The present methods may further include drying the obtained nanoparticles. In certain embodiments, drying the nanoparticles may include sonicating the nanoparticles.

In some embodiments, separating the nanoparticles may include centrifuging the colloidal system.

In a further embodiment, the resultant nanoparticles of nanosilica can have a density of about 2.48 g/cm$^3$.

The present disclosure also relates to a method of making nanoparticles, nanosilica, and/or nanoparticles of nanosilica from glass, the method comprising: gathering glass waste; adding an amount of the glass waste into a grinding bowl of a grinding machine; adding about 20 steel balls to the grinding bowl; grinding the glass waste in the grinding machine for about 300 minutes at about 300 RPM; obtaining a glass powder containing nanoparticles; adding the nanoparticles to a water solution comprising a dispersing agent to obtain a mixture; separating the nanoparticles from the water solution using a separation funnel; drying the separated nanoparticles using destabilizing techniques; and obtaining nanosilica.

In certain embodiments of the present methods, the dispersing agent can be prepared using sodium hexa-meta-phosphate (SHMP). The SHMP may have a concentration of about 0.01-0.1% by volume. In other embodiments, any other appropriate dispersing agent may be used, including but not limited to surfactants, ionic solutions, polyethelene glycol, and any combination thereof.

In some embodiments of the present methods, the destabilizing technique can comprise sonicating the nanoparticles. In other embodiments, the destabilizing technique may include drying the nanoparticles.

In other embodiments of the present methods, the destabilizing technique may further include centrifuging the mixture.

In other embodiments of the present methods, the nanoparticles can have a density of about 2.48 g/cm$^3$.

In a further embodiment, the present disclosure also relates to a method of making nanosilica from glass waste, the method comprising: gathering glass waste; adding the glass waste into a grinding bowl of a grinding machine; adding 26 steel balls to the grinding bowl; grinding the glass waste in the grinding machine for about 15 minutes at about 600 RPM to obtain a glass powder containing nanoparticles; adding the glass powder containing the nanoparticles to a water solution comprising a dispersing agent to obtain a colloidal system containing the nanoparticles; separating the nanoparticles from the colloidal system to obtain separated nanoparticles; and drying the separated nanoparticles to obtain nanosilica. The separating can be achieved from 1) the separation funnel and 2) centrifuging or heating.

In an embodiment of the present method, an amount of glass waste gathered and used according to the instant methods may be about 200 g. In other embodiments, the amount of glass waste may be more or less than 200 g depending on the size of the grinding bowl. In additional embodiments, after the glass waste is gathered, it may be crushed into ready to grind pieces prior to being added to the grinding bowl. In this regard, the glass waste may be crushed manually using a hammer, a mallet, or any other suitable device, technique, or tool. In an alternative embodiment, the glass waste may be crushed into ready to grind pieces using a glass crushing mechanism or machine.

In another embodiment of the present method, the dispersing agent may be prepared using a 0.01-0.1% by volume sodium hexa-meta-phosphate (SHMP). In other embodiments, the dispersing agent may include surfactants, ionic solutions, polyethelene glycol, and any combination thereof.

In another embodiment, drying the nanoparticles may include sonicating the nanoparticles.

In a further embodiment of the present methods, the resultant nanoparticles may have a density of about 2.48 g/cm³.

In an embodiment of the present methods, separating the nanoparticles from the colloidal system may comprises using a separation funnel and centrifuging or heating.

Various uses for nanoparticles such as nanosilica as described herein, include but are not limited to as concrete additives, adhesives, paints and painting, manufacturing of polymeric materials, biomedical applications, semiconductor systems, and solar systems.

Figure 2:
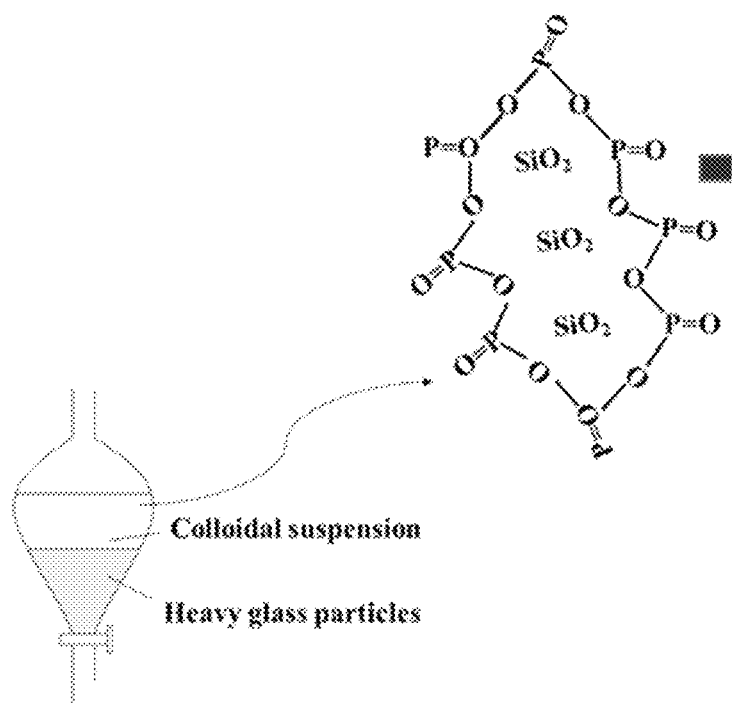
FIG. 2 illustrates an embodiment of a funnel separator used to separate nanoparticles from glass powder.
Figure 3:
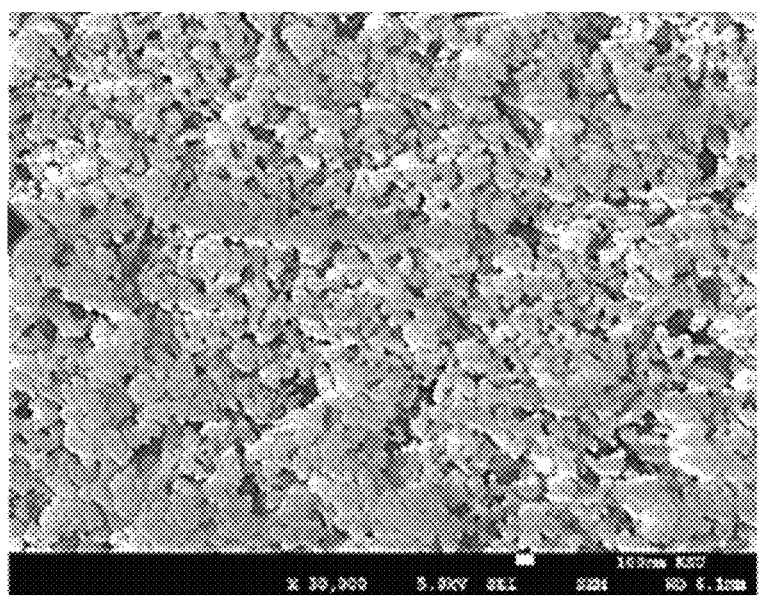
FIG. 3 is a scanning electron microscope photomicrograph of separated particles according to the separation process described herein.

In the presence of a dispersing agent, nano-sized particles can be transformed into a colloidal system. In this regard, after reaching the nano-sized glass particles, as confirmed by PSD analysis, the powder can be added to a solution containing 0.01-0.1% by volume sodium hexa-meta-phosphate (SHMP). This can transfer the nano-sized particles into the colloidal system that can be separated using a separation funnel, as demonstrated in FIG. 2. The heavy particles are to be separated first, followed by the colloidal suspension of nano-silica particles to be disturbed by centrifuging or heating to precipitate nano-sized particles. A SEM of the separated particles is illustrated in FIG. 3.

It is to be understood that embodiments of the method for producing nanosilica using glass waste as described herein are not limited to the specific embodiments described above but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of making nanosilica from glass waste, the method comprising:
   gathering glass waste;
   grinding the glass waste to obtain a glass powder comprising nanoparticles;
   adding the glass powder containing the nanoparticles to a water solution comprising a dispersing agent to obtain a colloidal system containing the nanoparticles;
   separating the nanoparticles from the colloidal system to obtain separated nanoparticles; and
   drying the separated nanoparticles to obtain the nanosilica;
   wherein the nanoparticles have a density of about 2.48 g/cm³.

2. The method of making nanosilica of claim 1, wherein an amount of glass waste comprises about 200 g.

3. The method of making nanosilica of claim 1, wherein the dispersing agent is prepared using sodium hexa-meta-phosphate (SHMP).

4. The method of making nanosilica of claim 3, wherein the SHMP comprises a concentration of about 0.01-0.1% by volume of the SMHP.

5. The method of making nanosilica of claim 1, wherein the nanoparticles are separated from the colloidal system according to a method selected from a group comprising using a separation funnel and centrifuging or heating.

6. The method of making nanosilica of claim 5, wherein drying the nanoparticles comprises sonicating the nanoparticles.

7. A method of making nanosilica from glass waste, the method comprising:
   gathering glass waste;
   adding an amount of the glass waste into a grinding bowl of a grinding machine;
   adding 20 steel balls to the grinding bowl;
   grinding the glass waste in the grinding machine for about 300 minutes at about 300 RPM to obtain a glass powder containing nanoparticles;
   adding the glass powder containing the nanoparticles to a water solution comprising a dispersing agent to obtain a colloidal system containing the nanoparticles;
   separating the nanoparticles from the colloidal system to obtain separated nanoparticles; and
   drying the separated nanoparticles to obtain the nanosilica.

8. The method of making nanosilica of claim 7, wherein the amount of the glass waste is about 200 g.

9. The method of making nanosilica of claim 7, wherein the dispersing agent is prepared using sodium hexa-meta-phosphate (SHMP).

10. The method of making nanosilica of claim 9, wherein the SHMP comprises a concentration of about 0.01-0.1% by volume of the SMHP.

11. The method of making nanosilica of claim 7, wherein separating the nanoparticles from the colloidal system comprises using a separation funnel.

12. The method of making nanosilica of claim 7, wherein separating the nanoparticles from the colloidal system comprises centrifuging or heating the colloidal system.

13. The method of making nanosilica of claim 7, wherein the nanoparticles have a density of about 2.48 g/cm³.

14. A method of making nanosilica from glass waste, the method comprising:
   gathering glass waste;
   adding the glass waste into a grinding bowl of a grinding machine;
   adding 26 steel balls to the grinding bowl;
   grinding the glass waste in the grinding machine for about 15 minutes at about 600 RPM to obtain a glass powder containing the nanoparticles;
   adding the glass powder containing the nanoparticles to a water solution comprising a dispersing agent to obtain a colloidal system containing the nanoparticles;
   separating the nanoparticles from the colloidal system to obtain separated nanoparticles; and
   drying the separated nanoparticles to obtain the nanosilica.

15. The method of making nanosilica of claim 14, wherein an amount of glass waste gathered is 200 g.

16. The method of making nanosilica of claim 14, wherein the dispersing agent is prepared using 0.01-0.1% by volume sodium hexa-meta-phosphate (SHMP).

17. The method of making nanosilica of claim 14, wherein drying the nanoparticles comprises sonicating the nanoparticles.

18. The method of making nanosilica of claim 14, wherein separating the nanoparticles from the colloidal system comprises one or more of using a separation funnel and centrifuging or heating.

19. The method of making nanosilica of claim 14, wherein the nanoparticles have a density of about 2.48 g/cm³.

* * * * *